United States Patent
Saji et al.

(10) Patent No.: US 9,425,678 B2
(45) Date of Patent: Aug. 23, 2016

(54) SWITCHING POWER SUPPLY APPARATUS AND SEMICONDUCTOR DEVICE

(71) Applicant: Panasonic Intellectual Property Management Co., Ltd., Osaka (JP)

(72) Inventors: Takashi Saji, Shiga (JP); Kensuke Takahashi, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/578,221

(22) Filed: Dec. 19, 2014

(65) Prior Publication Data

US 2015/0131334 A1    May 14, 2015

Related U.S. Application Data

(63) Continuation of application No. PCT/JP2013/003909, filed on Jun. 21, 2013.

(30) Foreign Application Priority Data

Jul. 6, 2012 (JP) ................................. 2012-152471

(51) Int. Cl.
*H02M 1/08* (2006.01)
*H02M 3/335* (2006.01)
(Continued)

(52) U.S. Cl.
CPC ...... *H02M 1/08* (2013.01); *H02M 1/36* (2013.01); *H02M 3/33507* (2013.01); *H02M 2001/0006* (2013.01); *H02M 2001/0032* (2013.01); *H02M 2001/0054* (2013.01); *Y02B 70/16* (2013.01)

(58) Field of Classification Search
CPC ............. H02M 2001/0006; H02M 2001/0054; H02M 2001/0032; H02M 1/08; H02M 1/36; H02M 3/33507
See application file for complete search history.

(56) References Cited

U.S. PATENT DOCUMENTS

| 8,179,106 B2 | 5/2012 | Tokura et al. |
| 2005/0207189 A1* | 9/2005 | Chen ............... H02M 1/40 363/21.15 |
| 2010/0060254 A1 | 3/2010 | Tokura et al. |

(Continued)

FOREIGN PATENT DOCUMENTS

| JP | 10-232722 A | 9/1998 |
| JP | 2000-245138 A | 9/2000 |

(Continued)

OTHER PUBLICATIONS

International Search Report issued in International Publication No. PCT/JP2013/003909 with Date of mailing Jul. 23, 2013, with English Translation.

*Primary Examiner* — Jue Zhang
(74) *Attorney, Agent, or Firm* — McDermott Will & Emery LLP

(57) ABSTRACT

Provided is a switching power supply apparatus that shifts to an OFF mode when electronic equipment is on standby, and includes: an OFF mode delay circuit that delays shifting to the OFF mode; and an electric storage unit and a power supply circuit that function as a power supply source of an OFF mode control circuit. With the configuration, the power consumption can almost be eliminated, and the switching power supply apparatus can start without any charge in an electricity storage component such as a primary battery or a secondary battery.

6 Claims, 13 Drawing Sheets

(51) Int. Cl.
*H02M 1/36* (2007.01)
*H02M 1/00* (2006.01)

(56) References Cited

U.S. PATENT DOCUMENTS

2012/0026759 A1* 2/2012 Balakrishnan et al. .... 363/21.15
2012/0026763 A1* 2/2012 Humphrey .......... H02M 1/4225
  363/65
2012/0047381 A1* 2/2012 Zhou ........................ G06F 1/26
  713/323

FOREIGN PATENT DOCUMENTS

| | | | |
|---|---|---|---|
| JP | 2003-299355 | A | 10/2003 |
| JP | 2008-136355 | A | 6/2008 |
| JP | 2010-088291 | A | 4/2010 |

* cited by examiner

SWITCHING POWER SUPPLY APPARATUS AND SEMICONDUCTOR DEVICE

CROSS REFERENCE TO RELATED APPLICATION

This is a continuation application of PCT International Application No. PCT/JP2013/003909 filed on Jun. 21, 2013, designating the United States of America, which is based on and claims priority of Japanese Patent Application No. 2012-152471 filed on Jul. 6, 2012. The entire disclosures of the above-identified applications, including the specifications, drawings and claims are incorporated herein by reference in their entirety.

FIELD

The present disclosure relates to (i) a switching power supply apparatus that controls an output voltage by switching an input voltage using a switching element, and (ii) a semiconductor device included in the switching power supply apparatus.

BACKGROUND

Conventionally, switching power supply apparatuses including semiconductor devices have widely been used as power supply apparatuses of electronic equipment such as home appliances and office equipment, for example, to improve the power conversion efficiency. The semiconductor devices include a semiconductor, that is, a switching element such as a transistor, and control an output voltage through a switching operation performed by the semiconductor.

In particular, reduction in power consumption of the electronic equipment on standby has received attention to prevent global warming, and switching power supply apparatuses having lower standby power consumption have grown in demand.

In recent years, a system of an AC adapter or a charger has been proposed which almost eliminates the power consumption, by reducing the output voltage when the switching power supply apparatus does not have to supply power, for example, when the system is disconnected from a loading apparatus (see Patent Literature (PTL) 1).

FIG. 15 is a circuit diagram illustrating a configuration example of a conventional switching power supply apparatus and a conventional semiconductor device. Specifically, FIG. 15 illustrates the configuration example of the conventional switching power supply apparatus that reduces an output voltage Vout on standby. The operations on standby will be simply described hereinafter.

A standby control circuit 791 included in a loading apparatus 790 at the secondary monitors a loading state. When shifting to the standby mode, the standby control circuit 791 causes a standby mode control circuit 690 to pass a current to a photocoupler 12. When the photocoupler 12 transmits a standby signal to the primary, the current flows through a resistor 17. Then, the voltage of an STB terminal of a switching control circuit 190 increases. When a standby mode detector 193 detects that the voltage of the STB terminal is higher than that of a comparison reference voltage source 194, a pulse width control circuit 191 shifts to the standby mode for suppressing the switching operation of a switching element 7 through a driving circuit 192 and a resistor 6 and decreasing the output voltage Vout of the switching power supply apparatus. When the standby mode is restored to the normal operation, the switching power supply apparatus cancels the standby mode and outputs a specified output voltage Vout by stopping the operation of the photocoupler 12 and decreasing the voltage of the STB terminal of the switching control circuit 190.

This system can reduce unnecessary power wasted for obtaining a voltage on standby more than the power for generating the specified output voltage Vout regardless of the operation state of the loading apparatus.

CITATION LIST

Patent Literature

[PTL 1] Unexamined Patent Application Publication No. 2003-299355

SUMMARY

Technical Problem

The conventional switching power supply apparatus disclosed in PTL 1 uses a photocoupler that transfers a connection status of the loading apparatus from the secondary to the primary. Since the photocoupler continues to operate on standby, each of the secondary and the primary consumes power. Since power continuously needs to be supplied to the secondary, the switching operation of the switching power supply apparatus cannot be completely stopped. Thus, a switching loss occurs.

The present disclosure has been conceived to solve the problems, and one non-limiting and exemplary embodiment provides (i) a switching power supply apparatus that can almost eliminate power consumption on standby and start regardless of a state of an electricity storage component, such as a primary battery or a secondary battery, and (ii) a semiconductor device included in the switching power supply apparatus.

Solution to Problem

In order to solve the problems, the switching power supply apparatus according to an aspect of the present disclosure includes: a switching element to which an input voltage is applied; an input/output converting circuit that converts the input voltage switched by the switching element into an output voltage, and supply power corresponding to the output voltage to a loading apparatus; a switching control circuit that controls a switching operation of the switching element, and has an OFF mode for stopping the switching operation to reduce power consumption; an OFF mode control circuit that continues to output an OFF mode cancellation signal for cancelling an operation of the switching control circuit in the OFF mode when the switching operation of the switching element is necessary, and avoids outputting the OFF mode cancellation signal to cause the switching control circuit to operate in the OFF mode when the switching operation is unnecessary; an OFF mode delay circuit that delays shifting to the OFF mode; an electric storage unit that functions as a power supply source of the OFF mode control circuit in the OFF mode; and a power supply circuit that functions as the power supply source of the OFF mode control circuit when the power corresponding to the output voltage can be supplied to the OFF mode control circuit.

Advantageous Effects

The switching power supply apparatus according to the present disclosure completely stops the switching operation and operations of the photocoupler on standby, and thus can shift to the OFF mode in which the power consumption is almost eliminated. Furthermore, the switching power supply apparatus can start without any charge in an electricity storage component such as a primary battery or a secondary battery, with inclusion of the OFF mode delay circuit and the power supply circuit.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Figure 1:
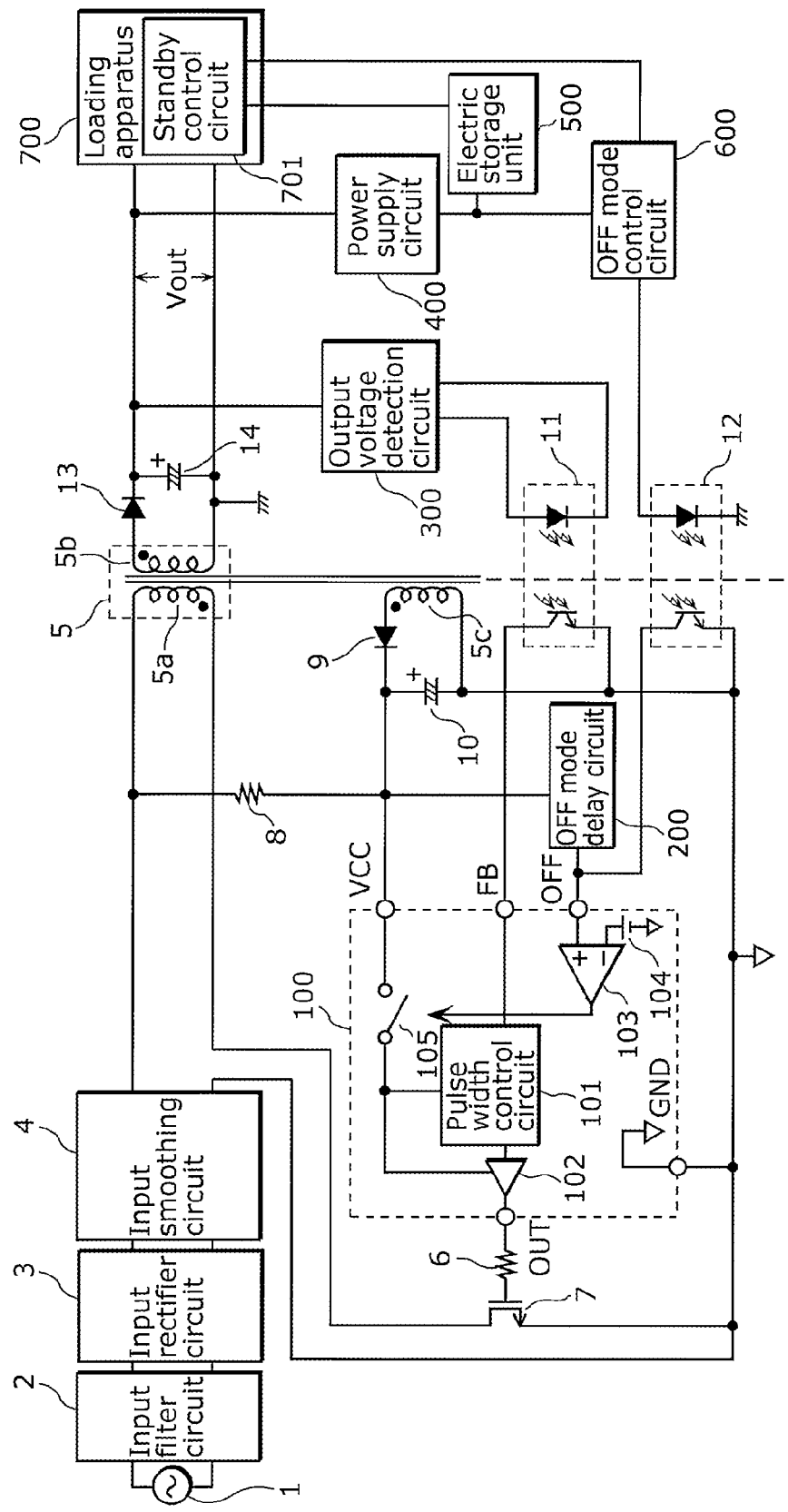
FIG. 1 is a circuit diagram illustrating a configuration example of a switching power supply apparatus and a semiconductor device according to Embodiment 1.

Examples of a method for completely stopping a switching operation of a switching power supply apparatus include using an electricity storage component such as a primary battery or a secondary battery as a power supply for operating a photocoupler on standby. However, since the electricity storage component consumes a large amount of power to continue to operate the photocoupler, such method is not practical.

Here, the photocoupler operates when the switching power supply apparatus is on standby, whereas the photocoupler stops when the switching power supply apparatus performs a normal operation. Reversing the relationship, that is, stopping the photocoupler when the switching power supply apparatus is on standby enables reduction in power consumption of the electricity storage component. Specifically, on standby, the power consumption of the switching power supply apparatus can be almost eliminated by completely stopping the switching operation of the switching power supply apparatus and operations of the photocoupler (OFF mode).

However, the system has the following problems.

As long as the electricity storage component fully accumulates charge in shifting from the OFF mode to the normal operation, the photocoupler is operated with the electricity storage component without any problem. However, when the electronic equipment is de-energized and unused for a long time, the charge of the electricity storage component may be insufficient, and the photocoupler may not be able to operate. In such a case, in an attempt to start the switching power supply apparatus, inability to shift to the normal operation while maintaining the OFF mode becomes a critical problem.

The switching power supply apparatus according to an aspect of the present disclosure solves the problems, and includes: a switching element to which an input voltage is applied; an input/output converting circuit that converts the input voltage switched by the switching element into an output voltage, and supply power corresponding to the output voltage to a loading apparatus; a switching control circuit that controls a switching operation of the switching element, and has an OFF mode for stopping the switching operation to reduce power consumption; an OFF mode control circuit that continues to output an OFF mode cancellation signal for cancelling an operation of the switching control circuit in the OFF mode when the switching operation of the switching element is necessary, and avoids outputting the OFF mode cancellation signal to cause the switching control circuit to operate in the OFF mode when the switching operation is unnecessary; an OFF mode delay circuit that delays shifting to the OFF mode; an electric storage unit that functions as a power supply source of the OFF mode control circuit in the OFF mode; and a power supply circuit that functions as the power supply source of the OFF mode control circuit when the power corresponding to the output voltage can be supplied to the OFF mode control circuit.

According to an aspect of the present disclosure, the input power from a commercial power supply in the OFF mode can be almost eliminated, and the switching power supply apparatus can start regardless of the state of the electricity storage component, such as a primary battery or a secondary battery.

Furthermore, the switching power supply apparatus may further includes a DC connector for connecting or disconnecting the loading apparatus, wherein the switching power supply apparatus may be controlled to operate in the OFF mode when the DC connector is disconnected from the loading apparatus.

Furthermore, the OFF mode control circuit, the electric storage unit, and the power supply circuit may be disposed closer to the loading apparatus than to the DC connector.

According to the aspect of the present disclosure, even when the DC connector is disconnected, that is, when the AC adapter is not used, the input power from the commercial power supply can be almost eliminated, and an ideal AC adapter can be embodied. Furthermore, the switching power supply apparatus can start regardless of the state of the electricity storage component, such as a primary battery or a secondary battery of electronic equipment.

Furthermore, the switching power supply apparatus may further include an OFF mode forced cancellation circuit that forcibly cancels the OFF mode regardless of presence or absence of output of the OFF mode cancellation signal.

Furthermore, the switching power supply apparatus may further include an input interruption detection circuit that outputs an input interruption detection signal to the OFF mode delay circuit when application of the input voltage is interrupted, wherein the OFF mode forced cancellation circuit may forcibly cancel the OFF mode when the OFF mode delay circuit receives the input interruption detection signal.

According to the aspect of the present disclosure, even when an input interruption period is short, the switching power supply apparatus can start with cancelation of the OFF mode. Furthermore, even when the electric storage unit is not fully charged, the switching power supply apparatus can certainly start.

Furthermore, the electric storage unit may be configured to supply power to the loading apparatus.

Since the electric storage unit can supply power to the loading apparatus also in the OFF mode, charging the electric storage unit in advance enables setting the loading apparatus in the normal operation to the OFF mode and almost eliminating the input power from the commercial power supply. For example, this technique can be applied to a peak shift function for shifting a part of the daytime power consumption of, for example, a notebook PC to the nighttime power consumption.

Furthermore, the switching control circuit may be a semiconductor device for controlling a switching power supply apparatus.

Accordingly, with complicated control including the OFF mode, the number of components of the switching power supply apparatus can be substantially reduced, and the switching power supply apparatus can be reduced in size, weight, and cost.

A switching power supply apparatus and a semiconductor device according to Embodiments will be described with reference to the drawings.

Embodiment 1

A switching power supply apparatus and a semiconductor device according to Embodiment 1 will be hereinafter described.

FIG. 1 is a circuit diagram illustrating a configuration example of a switching power supply apparatus and a semiconductor device according to Embodiment 1.

In FIG. 1, an input AC voltage from a commercial power supply 1 is applied as an input DC voltage to a primary winding 5a of a transformer 5 for converting power through an input filter circuit 2, an input rectifier circuit 3, and an input smoothing circuit 4.

The transformer 5 includes the primary winding 5a, a secondary winding 5b, and an auxiliary winding 5c. The primary winding 5a and the secondary winding 5b have opposite polarities. The switching power supply apparatus according to Embodiment 1 is a flyback switching power supply apparatus.

The primary winding 5a is connected to a switching element 7 to which the input DC voltage is applied. The switching element 7 has a control electrode (gate) that is controlled by switching between ON and OFF using an output signal from an OUT terminal of a switching control circuit 100.

The transformer 5 is an input/output (I/O) converting circuit that converts the input DC voltage switched by the switching element 7 into an output voltage, and supplies power corresponding to the output voltage to a loading apparatus 700.

Furthermore, the switching control circuit 100 is a semiconductor device that controls the switching operation of the switching element 7, and includes five external I/O terminals of a VCC terminal, an FB terminal, a GND terminal, the OUT terminal, and an OFF terminal. For example, as illustrated in FIG. 1, the switching control circuit 100 includes a pulse width control circuit 101, a driving circuit 102, an OFF mode detector 103, and an OFF mode switch 105, and is a semiconductor device for controlling the switching power supply apparatus. With the structure, the switching control circuit 100 has an OFF mode for stopping the switching operation of the switching element 7 and reducing the power consumption.

The VCC terminal is a power supply terminal of the switching control circuit 100. The power is normally supplied from the auxiliary winding 5c to the VCC terminal through a rectifier diode 9 and a smoothing capacitor 10. Furthermore, when the switching power supply apparatus starts or the switching operation of the switching element 7 is stopped, the power is supplied from an input DC voltage line through a resistor 8.

The FB terminal is a terminal to which a feedback signal output from an output voltage detecting circuit 300 is fed through a photocoupler 11, and controls the switching operation.

The GND terminal is connected to a low potential side of the input smoothing circuit 4, and has a base voltage for the primary winding side.

The OUT terminal is a terminal connected to the control electrode (gate) of the switching element 7 through the resistor 6.

The OFF terminal is a terminal connected to the VCC terminal through an OFF mode delay circuit 200, and a terminal for switching between the OFF mode and the normal operation when an OFF mode signal output from an OFF mode control circuit 600 is transmitted to the OFF mode detector 103 through the photocoupler 12 and the OFF mode delay circuit 200 and the OFF mode detector 103 compares the OFF mode signal with an output voltage of a comparison criterion voltage source 104.

The OFF mode delay circuit 200 delays the timing at which the switching control circuit 100 shifts from the normal operation to the OFF mode. The OFF mode delay circuit 200 is connected to the VCC terminal and the OFF terminal of the switching control circuit 100, and to the photocoupler 12.

Figure 2:
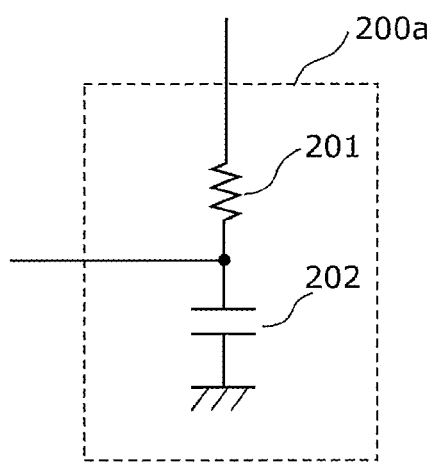
FIG. 2 is a circuit diagram illustrating a configuration example of an OFF mode delay circuit according to Embodiment 1.

FIG. 2 is a circuit diagram illustrating a configuration example of an OFF mode delay circuit 200a according to Embodiment 1. For example, the OFF mode delay circuit 200a in FIG. 2 includes a resistor 201 and a capacitor 202.

The OFF mode control circuit 600 is connected to the loading apparatus 700. When the switching operation of the switching element 7 is necessary, the OFF mode control circuit 600 continues to output an OFF mode cancellation signal for cancelling the OFF mode operation based on a signal from the loading apparatus 700. Furthermore, when the switching operation of the switching element 7 is unnecessary, the OFF mode control circuit 600 does not output the OFF mode cancellation signal to cause the switching power supply apparatus to operate in the OFF mode. Furthermore, the OFF mode control circuit 600 is connected to a power supply circuit 400 and an electric storage unit 500 for supplying power to the circuits.

Figure 3:
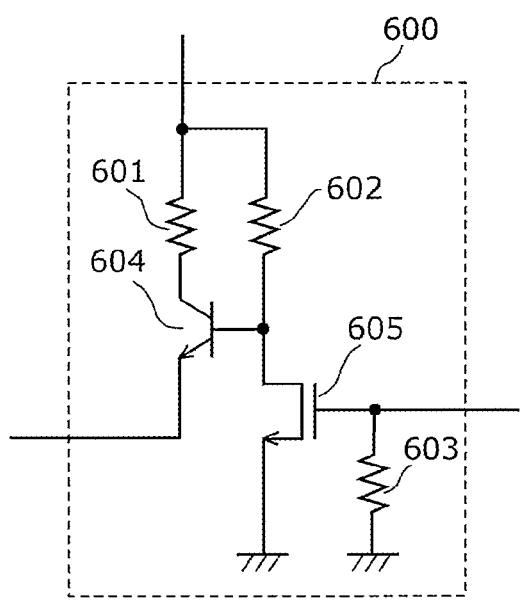
FIG. 3 is a circuit diagram illustrating a configuration example of an OFF mode control circuit according to Embodiment 1.

FIG. 3 is a circuit diagram illustrating a configuration example of the OFF mode control circuit 600 according to Embodiment 1. For example, as illustrated in FIG. 3, the OFF mode control circuit 600 includes resistors 601, 602, and 603, and transistors 604 and 605.

The power supply circuit 400 is connected to an output voltage Vout line to which the secondary winding 5b of the transformer 5 outputs an output voltage through a rectifier diode 13 and a smoothing capacitor 14. When power can be supplied from the output voltage Vout line to the OFF mode control circuit 600 and others, the power supply circuit 400 supplies the power to the OFF mode control circuit 600 and others.

Figure 4:
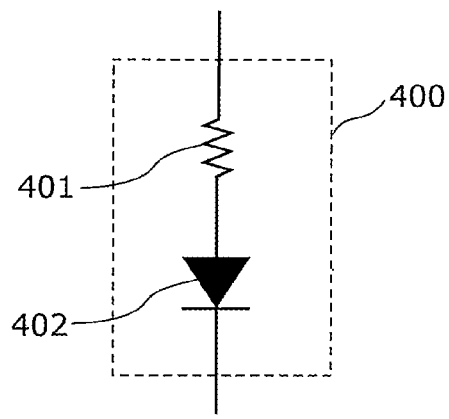
FIG. 4 is a circuit diagram illustrating a configuration example of a power supply circuit according to Embodiment 1.

FIG. 4 is a circuit diagram illustrating a configuration example of the power supply circuit 400 according to Embodiment 1. For example, the power supply circuit 400 includes a resistor 401 and a rectifier diode 402 as illustrated in FIG. 4.

The electric storage unit 500 is connected to the OFF mode control circuit 600 and the loading apparatus 700, and supplies power particularly in the OFF mode. The electric storage unit 500 supplies power also to the loading apparatus 700. Since the electric storage unit 500 can supply power to the loading apparatus 700 also in the OFF mode, charging the electric storage unit 500 in advance enables setting the loading apparatus 700 in the normal operation to the OFF mode and almost eliminating the input power from the commercial power supply 1. For example, this technique can be applied to a peak shift function for shifting a part of the daytime power consumption of, for example, a notebook PC to the nighttime power consumption.

Figure 5:
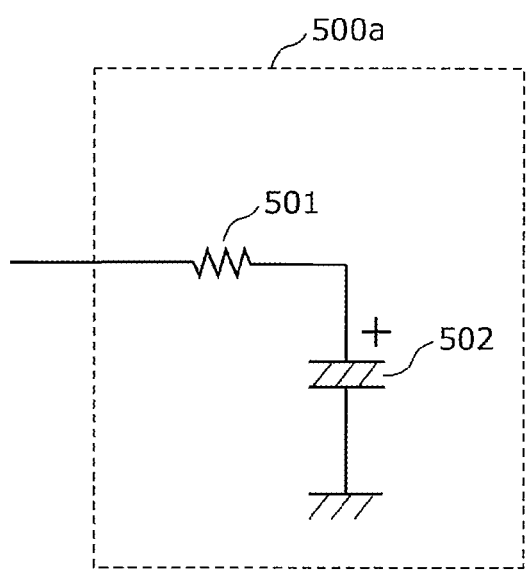
FIG. 5 is a circuit diagram illustrating a configuration example of an electric storage unit according to Embodiment 1.

FIG. 5 is a circuit diagram illustrating a configuration example of an electric storage unit 500a according to Embodiment 1. For example, the electric storage unit 500a in FIG. 5 includes a resistor 501 and a large-capacitance capacitor 502. The large-capacitance capacitor 502 is, for example, an electric double layer capacitor.

The loading apparatus 700 includes a standby control circuit 701, monitors, for example, a status of itself and the voltage of the electric storage unit 500, and outputs a status detection signal to the OFF mode control circuit 600. In the OFF mode, the electric storage unit 500 supplies power to the standby control circuit 701 and maintains the standby state.

The output voltage detecting circuit 300 is connected to the output voltage Vout line, and outputs a feedback signal corresponding to an output voltage value.

The operations of the switching power supply apparatus and the semiconductor device having such configuration in FIG. 1 will be described.

Upon input of AC voltage from the commercial power supply 1 through the input filter circuit 2, the input rectifier circuit 3 and the input smoothing circuit 4 rectify and smooth the AC voltage, and convert it into DC voltage. The DC voltage is supplied to the switching control circuit 100 through the resistor 8 as a starting current. When the switching control circuit 100 is operable, control on the switching element 7 for performing the switching operation is started.

Upon startup, the output voltage Vout at the secondary is so low that the output voltage detecting circuit 300 does not output the feedback signal to the switching control circuit 100. With repetition of the switching operation, the transformer 5 supplies power to the secondary and the output voltage Vout increases. When the output voltage Vout exceeds a voltage specified by the output voltage detecting circuit 300, the output voltage detecting circuit 300 controls a feedback signal so that a current corresponding to the feedback signal flows through the FB terminal of the switching control circuit 100. The pulse width control circuit 101 changes the duty ratio of the switching element 7 to an appropriate duty ratio using this feedback signal, and maintains the output voltage Vout as the specified voltage.

Here, the OFF mode control will be described by dividing it into three processes, (i) continuing the normal operation after the startup, (ii) then shifting to the OFF mode, and (iii) canceling the OFF mode.

First, the process of (i) continuing the normal operation after the startup will be described.

Upon startup, while the starting current is supplied to the switching control circuit 100, the current is supplied to the OFF mode delay circuit 200 so that the capacitor 202 is charged through the resistor 201. Specifically, an OFF terminal voltage of the switching control circuit 100 gradually increases. When the output voltage Vout increases, the power supply circuit 400 supplies power to the OFF mode control circuit 600 while charging the large-capacitance capacitor 502 of the electric storage unit 500. Immediately after the startup, the status detection signal from the standby control circuit 701 is in the LOW level because the loading apparatus 700 has not started to operate yet or the voltage of the electric storage unit 500 is low. Thus, the transistor 604 conducts electricity and the current flows through the photocoupler 12. When the photocoupler 12 operates, the charge accumulated in the capacitor 202 of the OFF mode delay circuit 200 is discharged, and the OFF terminal voltage of the switching control circuit 100 decreases. Here, the time constants of the resistor 201 and the capacitor 202 of the OFF mode delay circuit 200 are set so that the maximum OFF terminal voltage is lower than a voltage of the comparison criterion voltage source 104 of the OFF mode detector 103. Accordingly, during a period from the startup of the switching power supply apparatus to start of the operation of the photocoupler 12, the normal operation is continued by maintaining the OFF terminal voltage equal to or smaller than the voltage of the comparison criterion voltage source 104 of the OFF mode detector 103.

Next, the process of (ii) shifting from the normal operation to the OFF mode will be described.

When the startup is completed and the electric storage unit 500 is fully charged, for example, the amount of the power from the switching power supply apparatus to the loading apparatus 700 becomes small, for example, by turning OFF the power supply switch of the loading apparatus 700. Then, the standby control circuit 701 outputs a status detection signal. When the standby control circuit 701 outputs the status detection signal in the high level to the OFF mode control circuit 600, the transistor 604 is nonconducting, and the current to the photocoupler 12 is interrupted. Then, the capacitor 202 of the OFF mode delay circuit 200 stops discharging, and the capacitor 202 starts to be charged through the VCC terminal of the switching control circuit 100 and the resistor 201. When the OFF terminal voltage of the switching control circuit 100 increases and becomes higher than the voltage of the comparison criterion voltage source 104 of the OFF mode detector 103, the switching control circuit 100 turns OFF the OFF mode switch 105, and stops the switching operation of the switching element 7. Then, power is not supplied to the circuit blocks inside the switching control circuit 100 where the operations are unnecessary, and thus, the power consumption of the switching control circuit 100 substantially decreases. Since the switching operation of the switching element 7 is stopped, the auxiliary winding 5c cannot supply power to the switching control circuit 100. However, the power dissipation of the switching control circuit 100 is, for example, approximately 10 μA, and can be reduced to lower than several mW even with supply of the power from the input DC voltage line through the resistor 8. Thus, in the OFF mode according to Embodiment 1, the input power from the commercial power supply 1 of the switching power supply apparatus can be almost eliminated.

Next, the process of (iii) cancelling the OFF mode from the OFF mode state and shifting to the normal operation will be described.

In the OFF mode, power is supplied from the input DC voltage line to the switching control circuit 100 through the resistor 8 in the primary winding side of the switching power supply apparatus so that the OFF mode state is maintained. In the secondary winding side of the switching power supply apparatus, supplying power from the electric storage unit 500 to the standby control circuit 701 of the loading apparatus 700 enables maintaining of the standby state. When the switching power supply apparatus needs to supply power to the loading apparatus 700 by, for example, turning ON the power supply switch of the loading apparatus 700, the standby control circuit 701 inverts the status detection signal. When the status detection signal to be transmitted to the OFF mode control circuit 600 is inverted from the high level to the low level, the transistor 604 becomes conducting, and a current flows through the photocoupler 12. Since the output voltage Vout is low, the electric storage unit 500 supplies the current to the photocoupler 12 through the OFF mode control circuit 600. Once the photocoupler 12 starts to operate, the capacitor 202 of the OFF mode delay circuit 200 starts to discharge, and the OFF terminal voltage of the switching control circuit 100 decreases. When the OFF terminal voltage of the switching control circuit 100 is lower than the voltage of the comparison criterion voltage source 104 of the OFF mode detector 103, the switching control circuit 100 turns ON the OFF mode switch 105, and resumes the switching operation of the switching element 7. As a result, the output voltage Vout increases, and the power is supplied to the loading apparatus 700 while the output voltage Vout is maintained constant with the feedback control by the switching control circuit 100. Furthermore, while charging the large-capacitance capacitor 502 of the electric storage unit 500, the power supply circuit 400 supplies power to the OFF mode control circuit 600. The photocoupler 12 continues the operation, while the switching power supply apparatus maintains the normal operation.

Using the charge stored in the electric storage unit 500, it is necessary to operate the standby control circuit 701 of the loading apparatus 700 and cause a current to flow through the photocoupler 12 for cancelling the OFF mode. Here, the standby control circuit 701 monitors the voltage of the electric storage unit 500. When detecting that the monitored voltage is lower than a predetermined voltage, the standby control circuit 701 cancels the OFF mode and charges the electric storage unit 500. When charging the electric storage unit 500 is completed and the switching operation of the switching element 7 is unnecessary, the switching power supply apparatus shifts to the OFF mode.

As such, the switching power supply apparatus according to Embodiment 1 stops the switching operation of the switching element 7 and the operation of the photocoupler 12 on standby, thus almost eliminating the input power from the commercial power supply 1. Furthermore, the switching power supply apparatus can start without any charge in the electric storage unit 500, with inclusion of the OFF mode delay circuit 200 and the power supply circuit 400. Specifically, the input power from the commercial power supply 1 in the OFF mode can be almost eliminated, and the switching power supply apparatus can start regardless of the state of the electricity storage component, such as a primary battery or a secondary battery.

Although the switching control circuit 100 is a semiconductor device according to Embodiment 1, a part of the circuit blocks may be components different from those of such semiconductor device. Furthermore, for example, the switching element 7 and the OFF mode delay circuit 200 may be formed on the same semiconductor substrate as the switching control circuit 100.

(Variation 1 of Embodiment 1)

Although the switching power supply apparatus according to Variation 1 of Embodiment 1 is almost the same as the switching power supply apparatus according to Embodiment 1, the configuration of the electric storage unit 500 is different from that according to Embodiment 1.

Figure 6:
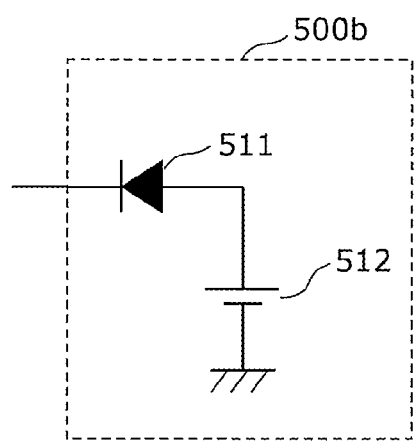
FIG. 6 is a circuit diagram illustrating a configuration example of an electric storage unit according to Variation 1 of Embodiment 1.

FIG. 6 is a circuit diagram illustrating a configuration example of an electric storage unit 500*b* according to Variation 1 of Embodiment 1. Specifically, FIG. 6 illustrates an example of a specific circuit configuration of the electric storage unit 500*b* in the switching power supply apparatus according to Variation 1. The electric storage unit 500*b* includes a rectifier diode 511 and a primary battery 512. The primary battery 512 is, for example, a coin-type cell such as a lithium cell.

The operations particularly differences with Embodiment 1 will be described hereinafter.

The switching power supply apparatus according to Variation 1 cannot charge the primary battery 512. When the voltage of the primary battery 512 is low, the standby control circuit 701 and the OFF mode control circuit 600 cannot normally operate. Thus, when the voltage of the primary battery 512 is lower than a predetermined value, the status detection signal from the standby control circuit 701 is always in the low level, and the switching power supply apparatus does not shift to the OFF mode. Specifically, although the power consumption of the switching power supply apparatus on standby increases, there is no problem in shifting to the normal operation. Furthermore, replacement of the primary battery 512 enables shifting to the OFF mode.

As long as the primary battery 512 is fully charged in the switching power supply apparatus according to Variation 1, the standby control circuit 701 of the loading apparatus 700 and the OFF mode control circuit 600 can operate. Thus, the switching power supply apparatus herein can maintain the OFF mode for a longer time than that of the switching power supply apparatus according to Embodiment 1. Furthermore, since the primary battery 512 does not have to be charged, the power consumption on standby can always almost be eliminated during a period when the primary battery 512 is fully charged.

While the commercial power supply 1 is not connected to the switching power supply apparatus, the standby control circuit 701 and the OFF mode control circuit 600 continue to operate with the primary battery 512. Thus, once the OFF mode is cancelled, the current continues to flow through the photocoupler 12. However, since the switching element 7 cannot perform the switching operation, the charge of the primary battery 512 is wasted. Thus, when the standby control circuit 701 outputs the status detection signal for a certain period and the switching element 7 does not supply power through the switching operation, the current to the photocoupler 12 may be interrupted. For example, when the standby control circuit 701 outputs a status detection signal for one second and no power is supplied, setting an interruption period for 99 seconds and outputting the status detection signal again has only to be repeated. Accordingly, the power dissipation from the primary battery 512 to the photocoupler 12 can be reduced by 99%.

(Variation 2 of Embodiment 1)

Although the switching power supply apparatus according to Variation 2 of Embodiment 1 is almost the same as that according to Embodiment 1, the configuration and the connection status of the electric storage unit 550 are different from those of the electric storage unit 500 according to Embodiment 1.

Figure 7:
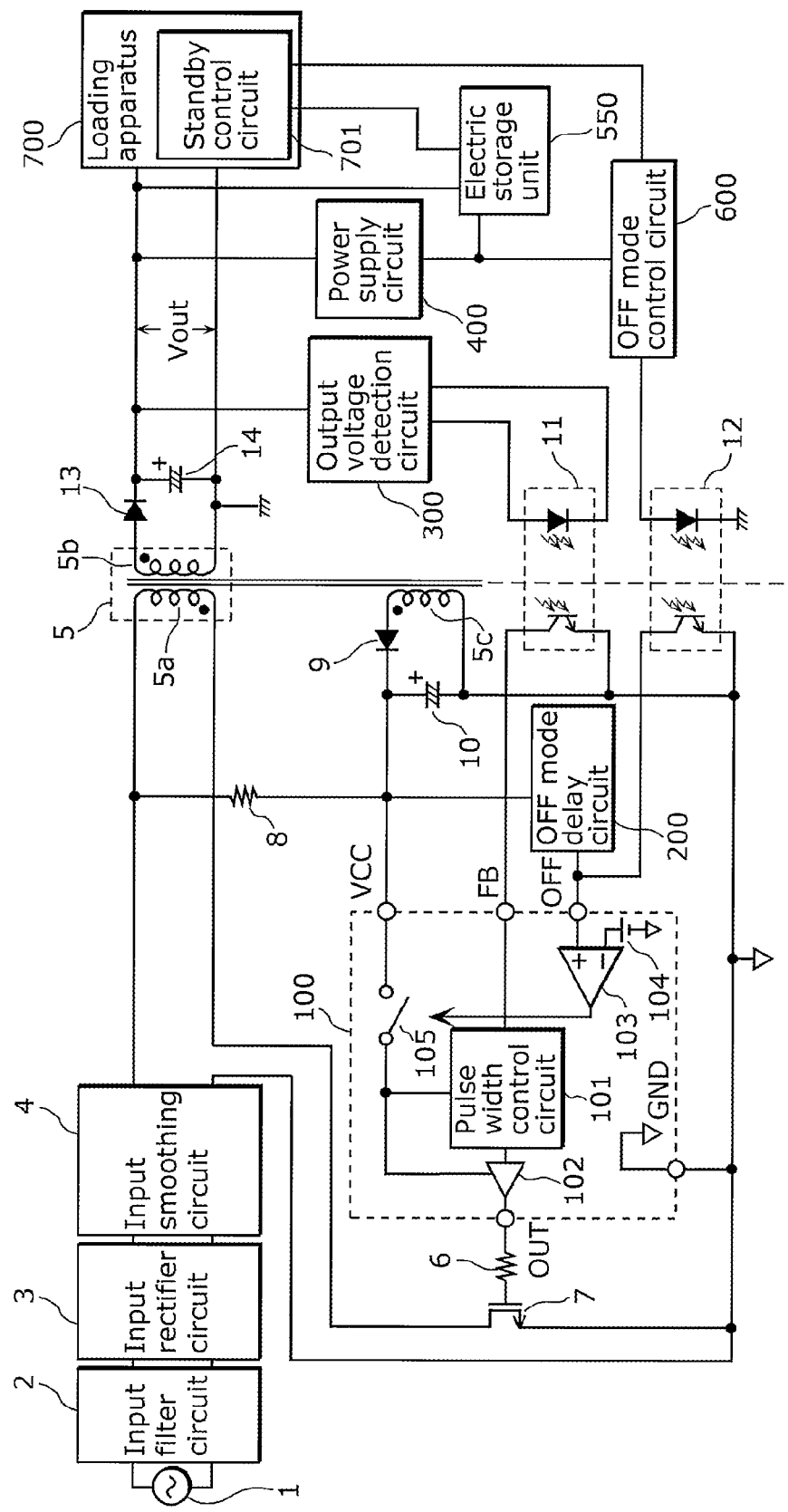
FIG. 7 is a circuit diagram illustrating a configuration example of a switching power supply apparatus and a semiconductor device according to Variation 2 of Embodiment 1.
Figure 8:
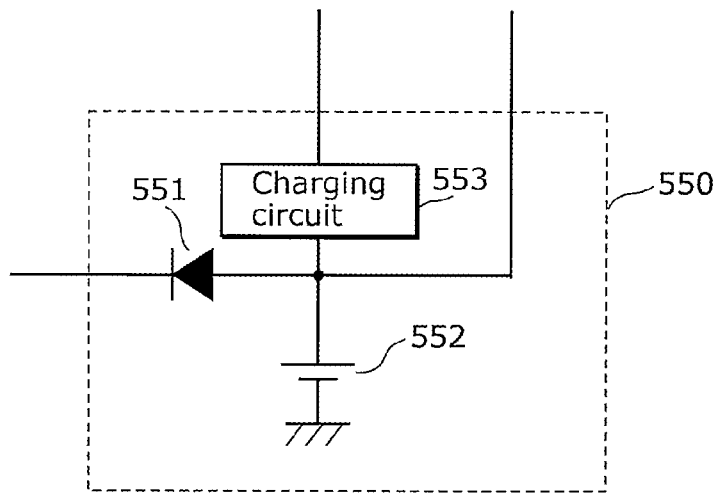
FIG. 8 is a circuit diagram illustrating a configuration example of an electric storage unit according to Variation 2 of Embodiment 1.

FIG. 7 is a circuit diagram illustrating a configuration example of a switching power supply apparatus and a semiconductor device according to Variation 2 of Embodiment 1. Furthermore, FIG. 8 is a circuit diagram illustrating a configuration example of an electric storage unit 550 according to Variation 2 of Embodiment 1. The electric storage unit 550 in FIG. 8 includes a rectifier diode 551, a secondary battery 552, and a charging circuit 553. The secondary battery 552 is, for example, a chargeable battery such as a lithium ion battery. Furthermore, the charging circuit 553 is a circuit that is connected to the output voltage Vout line and controls charging of the secondary battery 552.

The operations particularly differences with Embodiment 1 will be described hereinafter.

The secondary battery 552 generally needs complicated charging control. Thus, Variation 2 differs from Embodiment 1 in the charging operation by the electric storage unit 550, that is, charging the secondary battery 552 by the charging circuit 553. While the charging circuit 553 monitors the voltage of the secondary battery 552, it rectifies the charging current.

As long as the secondary battery 552 is fully charged in the switching power supply apparatus according to Variation 2, the standby control circuit 701 of the loading apparatus 700 and the OFF mode control circuit 600 can operate. Thus, when the switching power supply apparatus herein can be charged fully during the normal operation, it can maintain the OFF mode for a longer time than that according to Embodiment 1.

(Variation 3 of Embodiment 1)

Although the switching power supply apparatus according to Variation 3 of Embodiment 1 is almost the same as that according to Embodiment 1, the configuration and the connection status of an OFF mode delay circuit 250 are different from those of the OFF mode delay circuit 200 according to Embodiment 1. Furthermore, the switching power supply apparatus additionally includes an input interruption detection circuit 800. According to Variation 3, the switching power supply apparatus includes an OFF mode forced cancellation circuit that forcibly cancels the OFF mode regardless of the presence or absence of output of an OFF mode cancellation signal.

Figure 9:
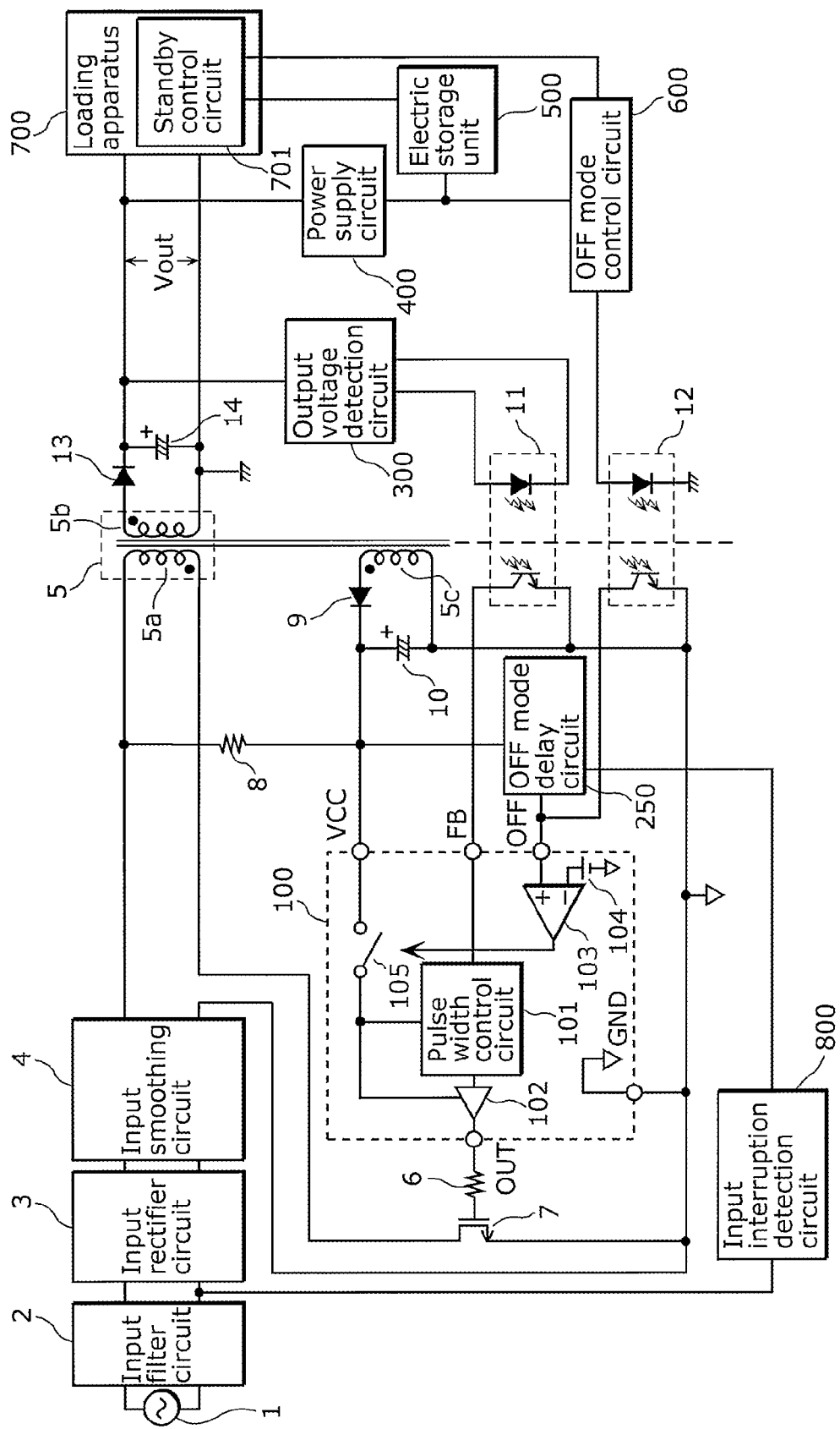
FIG. 9 is a circuit diagram illustrating a configuration example of a switching power supply apparatus and a semiconductor device according to Variation 3 of Embodiment 1.
Figure 10:
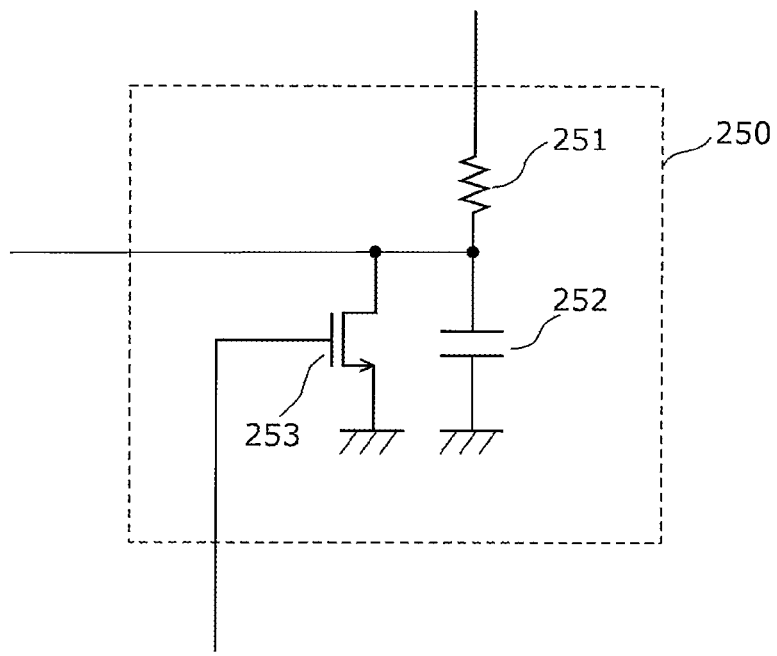
FIG. 10 is a circuit diagram illustrating a configuration example of an OFF mode delay circuit according to Variation 3 of Embodiment 1.

FIG. 9 is a circuit diagram illustrating a configuration example of a switching power supply apparatus and a semiconductor device according to Variation 3. The input interruption detection circuit 800 is connected between the input filter circuit 2 and the input rectifier circuit 3, and monitors the voltage of the commercial power supply 1. Furthermore, FIG. 10 is a circuit diagram illustrating a configuration example of the OFF mode delay circuit 250 according to Variation 3. The OFF mode delay circuit 250 in FIG. 10 includes a resistor 251, a capacitor 252, and a transistor 253.

The operations particularly differences with Embodiment 1 will be described hereinafter.

According to Variation 3, when the input interruption detection circuit 800 detects an interruption of the commercial power supply 1, the OFF mode delay circuit 250 sets the transistor 253 to the conduction state. Specifically, the input interruption detection circuit 800 outputs an input interruption detection signal to the OFF mode delay circuit 250 when application of the input voltage is interrupted. Upon receipt of the input interruption detection signal, the OFF mode delay circuit 250 forcibly cancels the OFF mode regardless of the presence or absence of output of an OFF mode cancellation signal. Specifically, when the photocoupler 12 does not operate, the transistor 253 discharges the charge accumulated in the capacitor 252. Accordingly, when the commercial power supply 1 is interrupted in the OFF mode, the OFF mode is cancelled. The OFF mode delay circuit 250 functions as an OFF mode forced cancellation circuit that forcibly cancels the OFF mode regardless of the presence or absence of output of an OFF mode cancellation signal. Then, with connection to the commercial power supply 1, the capacitor 252 of the OFF mode delay circuit 250 starts without any charge.

Even when a period during which the commercial power supply 1 is interrupted is short, the switching power supply apparatus according to Variation 3 can start in a state where the OFF mode is cancelled at the next startup. Furthermore, the switching power supply apparatus can certainly start even when the electric storage unit 500 is not fully charged.

The input interruption detection circuit 800 may be formed on the same semiconductor substrate as the switching control circuit 100.

(Variation 4 of Embodiment 1)

Although the switching power supply apparatus according to Variation 4 of Embodiment 1 is almost the same as that according to Embodiment 1, the configuration and the connection status of a switching control circuit 150 are different from those of the switching control circuit 100 according to Embodiment 1. Furthermore, the configuration of the OFF mode delay circuit 200 is also different.

Figure 11:
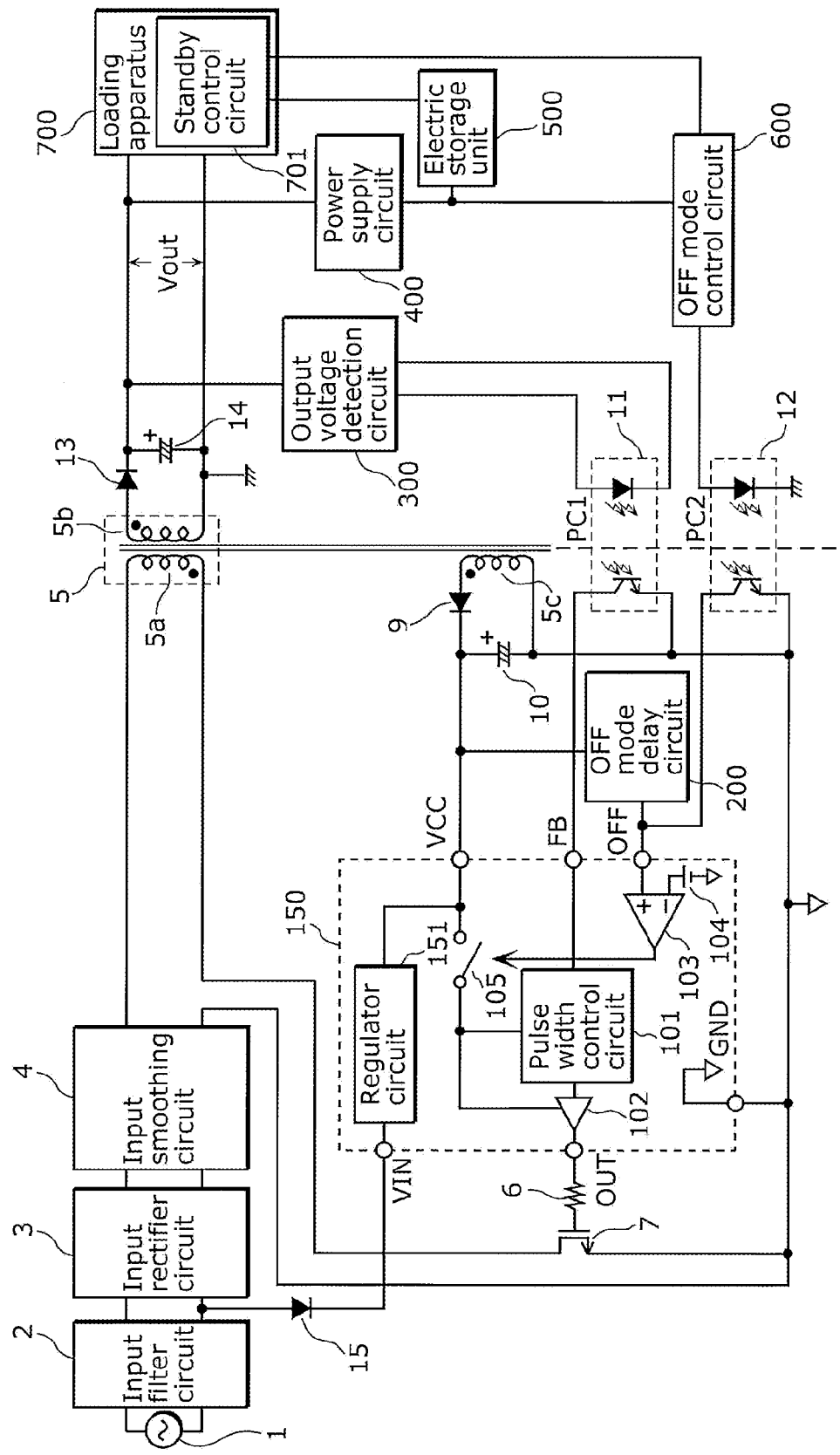
FIG. 11 is a circuit diagram illustrating a configuration example of a switching power supply apparatus and a semiconductor device according to Variation 4 of Embodiment 1.
Figure 12:
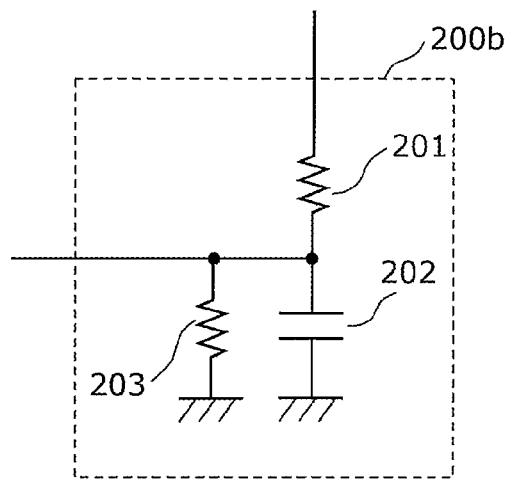
FIG. 12 is a circuit diagram illustrating a configuration example of an OFF mode delay circuit according to Variation 4 of Embodiment 1.

FIG. 11 is a circuit diagram illustrating a configuration example of a switching power supply apparatus and a semiconductor device according to Variation 4 of Embodiment 1. The switching power supply apparatus according to Variation 4 additionally includes a rectifier diode 15, and a VIN terminal and a regulator circuit 151 in the switching control circuit 150, instead of the resistor 8 in the configuration according to Embodiment 1. Furthermore, FIG. 12 is a circuit diagram illustrating a configuration example of an OFF mode delay circuit 200*b* according to Variation 4. The OFF mode delay circuit 200*b* includes a resistor 203 in addition to the constituent elements of the OFF mode delay circuit 200*a* according to Embodiment 1. The resistance values of the resistor 201 to the resistor 203 are set at, for example, a ratio of 1:10.

The operations particularly differences with Embodiment 1 will be described hereinafter.

In the switching power supply apparatus according to Variation 4, the voltage from the commercial power supply 1 in the startup that has been half-wave rectified by the rectifier diode 15 is applied to the VIN terminal of the switching control circuit 150. While stepping down the applied voltage, the regulator circuit 151 inside the switching control circuit 150 supplies the voltage to the smoothing capacitor 10 through the VCC terminal. When a VCC voltage increases and the switching control circuit 150 is operable, control on the switching operation of the switching element 7 is started. In contrast, the regulator circuit 151 interrupts supply of power to the VCC terminal, and only the auxiliary winding 5*c* supplies power to the switching control circuit 150. The subsequent normal operations and the operations for shifting to the OFF mode are the same as those according to Embodiment 1. However, the difference is that the VIN terminal supplies power to the switching control circuit 150 and the OFF mode delay circuit 200b in the OFF mode in the same manner as in the startup.

In the switching power supply apparatus according to Variation 4, even when the photocoupler 12 does not operate, the resistor 203 discharges the charge accumulated in the capacitor 202. Furthermore, power is supplied to the OFF mode delay circuit 200b through the rectifier diode 15 connected prior to the input rectifier circuit 3. Thus, when the commercial power supply 1 is interrupted, supply of the power to the OFF mode delay circuit 200b is interrupted regardless of the charge amount accumulated in a capacitor of the input smoothing circuit 4. As a result, a period from interruption of the commercial power supply 1 in the OFF mode to the cancellation of the OFF mode becomes much shorter than that according to Embodiment 1. Then, with connection to the commercial power supply 1, the capacitor 202 of the OFF mode delay circuit 200b starts without any charge.

Even when a period during which the commercial power supply 1 is interrupted is short, the switching power supply apparatus according to Variation 4 can start in a state where the OFF mode is cancelled at the next startup. Furthermore, the switching power supply apparatus can certainly start even when the electric storage unit 500 is not fully charged.

Embodiment 2

Next, a switching power supply apparatus according to Embodiment 2 will be hereinafter described. Embodiment 2 will describe another configuration of the switching power supply apparatus aiming at charging a secondary battery, such as a charger of a lithium ion battery.

Figure 13:
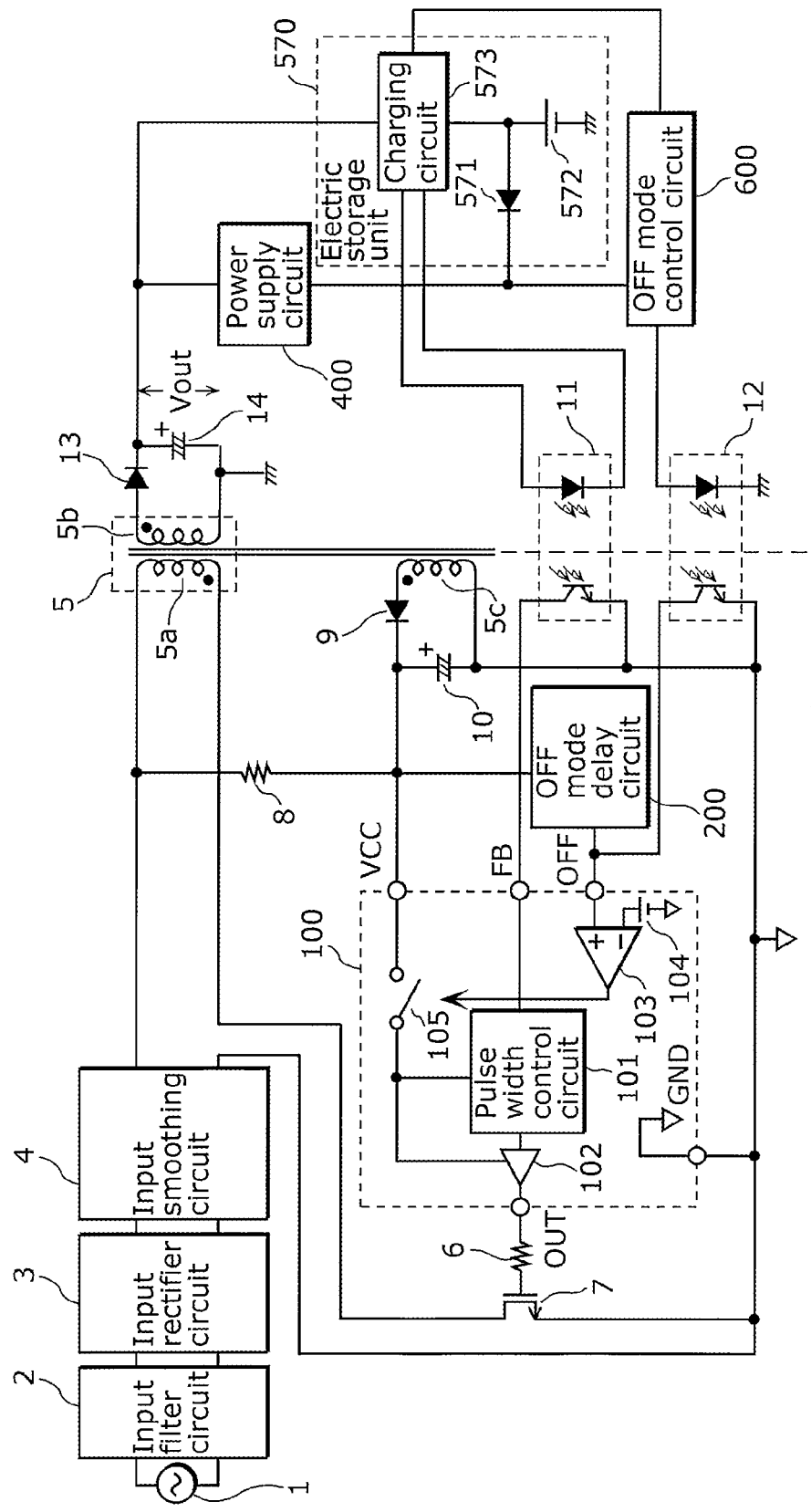
FIG. 13 is a circuit diagram illustrating a configuration example of a switching power supply apparatus and a semiconductor device according to Embodiment 2.

FIG. 13 is a circuit diagram illustrating a configuration example of a switching power supply apparatus and a semiconductor device according to Embodiment 2.

The switching power supply apparatus in FIG. 13 differs from that in FIG. 1 according to Embodiment 1 in the configuration of the secondary. An electric storage unit 570 includes a rectifier diode 571, a secondary battery 572, and a charging circuit 573. Furthermore, the charging circuit 573 of the electric storage unit 570 is connected to a photocoupler 11 for feedback control and the OFF mode control circuit 600.

The description of the switching power supply apparatus according to Embodiment 2 is omitted by assigning the same reference numerals to the same constituent elements of the switching power supply apparatus according to Embodiment 1.

The switching power supply apparatus according to Embodiment 2 is aimed at charging the secondary battery 572. Thus, the secondary battery 572 is charged in the normal operation. The feedback signal output from the charging circuit 573 controls the switching operation of the switching element 7 to perform control on a constant current and a constant voltage. When charging the secondary battery 572 is completed, the switching operation of the switching element 7 is unnecessary. Thus, the charging circuit 573 outputs the status detection signal to the OFF mode control circuit 600, and the operation mode shifts to the OFF mode by stopping the operation of the photocoupler 12. In the OFF mode, the secondary battery 572 supplies power to the charging circuit 573 and the OFF mode control circuit 600, thus maintaining the OFF mode. Since the power dissipation of the charging circuit 573 and the OFF mode control circuit 600 is minute, the voltage of the secondary battery 572 does not greatly decrease for a short period. However, when charging the secondary battery 572 is completed and the secondary battery 572 continues to be connected to the switching power supply apparatus for a long time, the voltage of the secondary battery 572 starts to decrease. Then, the status detection signal output from the charging circuit 573 is inverted, the OFF mode is cancelled, and the secondary battery 572 is again being charged.

Furthermore, even when the switching power supply apparatus starts without any charge in the secondary battery 572, it can continue the normal operation as in Embodiment 1 and the secondary battery 572 can be charged, with inclusion of the OFF mode delay circuit 200 and the power supply circuit 400.

As described above, even when the switching power supply apparatus according to Embodiment 2 starts without any charge in the secondary battery 572, the switching operation of the switching element 7 can be continued and the secondary battery 572 can be charged. Furthermore, after charging the secondary battery 572 is completed, the switching power supply apparatus shifts to the OFF mode, thus almost eliminating the input power from the commercial power supply 1, and embodying an ideal charger for the secondary battery 572.

Embodiment 3

Next, a switching power supply apparatus according to Embodiment 3 will be hereinafter described. Embodiment 3 will describe a configuration of a switching power supply apparatus including a DC connector, such as an AC adapter connected to a notebook PC.

Figure 14:
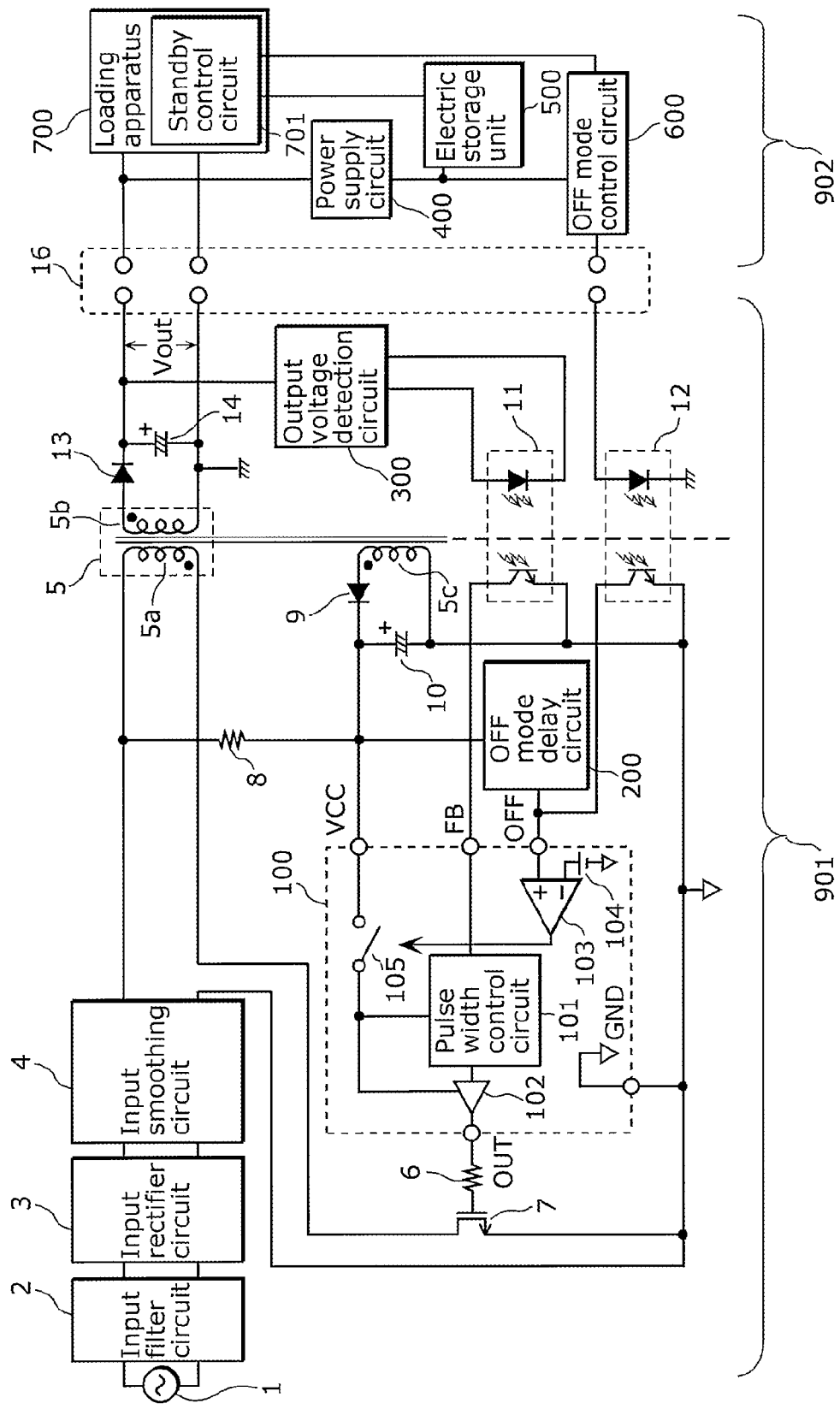
FIG. 14 is a circuit diagram illustrating a configuration example of a switching power supply apparatus and a semiconductor device according to Embodiment 3.
Figure 15:
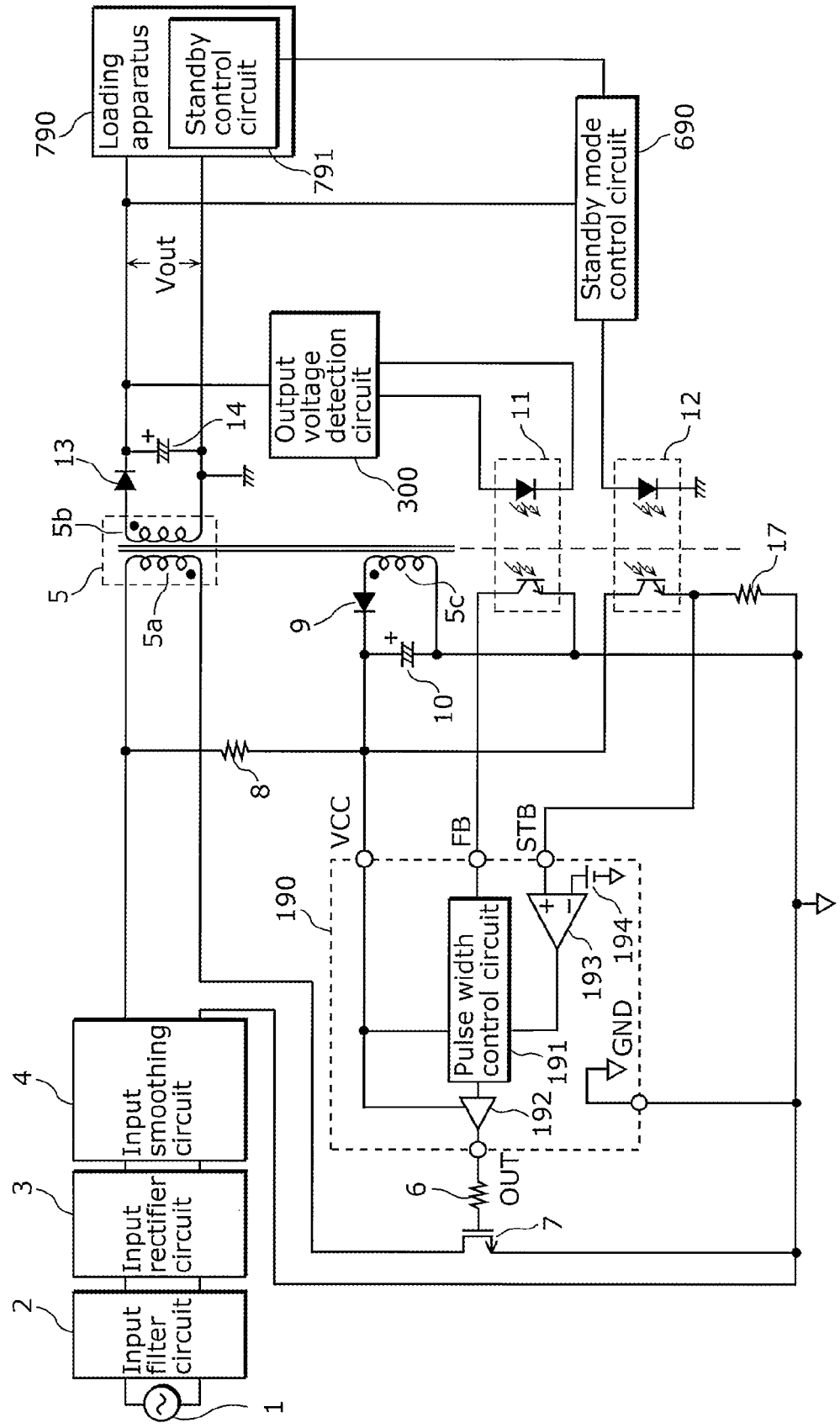
FIG. 15 is a circuit diagram illustrating a configuration example of a conventional switching power supply apparatus and a conventional semiconductor device.

FIG. 14 is a circuit diagram illustrating a configuration example of a switching power supply apparatus and a semiconductor device according to Embodiment 3.

The switching power supply apparatus in FIG. 14 differs from that in FIG. 1 according to Embodiment 1 only in including a DC connector 16 in the secondary. The DC connector 16 can remove an AC adapter 901 from electronic equipment 902. In other words, the DC connector 16 is a terminal for connecting or disconnecting the loading apparatus 700.

In the configuration of the secondary, a rectifier diode 13, a smoothing capacitor 14, an output voltage detection circuit 300, and the photocouplers 11 and 12 are disposed in the AC adapter 901, while the power supply circuit 400, the electric storage unit 500, and the OFF mode control circuit 600 are disposed in the electronic equipment 902. The DC connector 16 includes total three pairs of connector parts including two pairs of output voltage Vout lines and a pair of OFF mode cancellation signal lines.

The description of the switching power supply apparatus according to Embodiment 3 is omitted by assigning the same reference numerals to the same constituent elements of the switching power supply apparatus according to Embodiment 1.

When the DC connector 16 is connected, the configuration of the switching power supply apparatus according to Embodiment 3 is the same as that according to Embodiment 1, and the switching power supply apparatus operates in the same manner in startup and shifting to and cancelling the OFF mode.

The operations different from those according to Embodiment 1, that is, the case where the DC connector 16 is disconnected will be described.

First, the case where the DC connector 16 shifts from the connection state to the non-connection state will be described.

When the DC connector 16 is connected and then shifts to the non-connection state in the OFF mode, the operation of the photocoupler 12 remains stopped. Thus, the OFF mode is maintained.

In the normal operation where the DC connector 16 is connected and power is supplied to the electronic equipment 902 by the switching operation of the switching element 7, if the DC connector 16 shifts to the non-connection state, the photocoupler 12 operated in the normal operation is stopped. Thus, the switching power supply apparatus shifts to the OFF mode. Since power is not supplied from the AC adapter 901, the electronic equipment 902 shifts to the standby state or continues the normal operation with a secondary battery stored in the loading apparatus 700.

Specifically, when the DC connector 16 is set to the non-connection state regardless of the state of the electronic equipment 902, the power consumption is almost eliminated.

Next, the case where the DC connector 16 shifts from the non-connection state to the connection state will be described.

When the DC connector 16 is connected, the OFF mode control circuit 600 is connected to the photocoupler 12. Thus, the OFF mode control using the status detection signal output from the standby control circuit 701 of the loading apparatus 700 becomes possible. Specifically, when power needs to be supplied to the electronic equipment 902, the OFF mode is cancelled, and the switching operation of the switching element 7 starts. Furthermore, when power does not have to be supplied to the electronic equipment 902, the OFF mode is continued.

In summary, the switching power supply apparatus according to Embodiment 3 can produce the same advantages as those by the switching power supply apparatus according to Embodiment 1. At the same time, even when the DC connector 16 is not connected, that is, when the AC adapter 901 is not used, the input power from the commercial power supply 1 can be almost eliminated, and the ideal AC adapter 901 can be embodied. Furthermore, the switching power supply apparatus can start regardless of the state of an electricity storage component, such as a primary battery or a secondary battery of electronic equipment.

Although the switching power supply apparatus according to the present disclosure is described hereinbefore based on Embodiments, the present disclosure is not limited by these Embodiments. Without departing from the scope of the present disclosure, the present disclosure includes an embodiment with some modifications on Embodiments that are conceived by a person skilled in the art, and another embodiment obtained through combinations of the constituent elements and steps of different Embodiments in the present disclosure.

Furthermore, the switching control circuits 100, 150, and 190 according to the present disclosure may be semiconductor devices that are for controlling the switching power supply apparatuses according to Embodiments 1 to 3 and included in the switching power supply apparatuses. Accordingly, with complicated control including the OFF mode, the number of components of the switching power supply apparatus can be substantially reduced, and the switching power supply apparatus can be reduced in size, weight, and cost.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The switching power supply apparatus and the semiconductor device according to the present disclosure completely stops the switching operation of the switching power supply apparatus and operations of the photocoupler on standby, and thus can almost eliminate the power consumption of the switching power supply apparatus. Furthermore, the switching power supply apparatus can start without any charge in an electricity storage component such as a primary battery or a secondary battery, with inclusion of a delay circuit and a power supply circuit. Thus, one or more exemplary embodiments disclosed herein are applicable to switching power supply apparatuses such as those in an AC-DC converter, a DC-DC converter, and an outboard AC adapter that are included in various pieces of electronic equipment.

The invention claimed is:

1. A switching power supply apparatus comprising:
   a switching element to which an input voltage is applied;
   an input/output converting circuit that converts the input voltage switched by the switching element into an output voltage, and supply power corresponding to the output voltage to a loading apparatus;
   a switching control circuit that controls a switching operation of the switching element, and has an OFF mode for stopping the switching operation, the switching control circuit being placed in the OFF mode when an OFF mode cancellation signal for cancelling the OFF mode is not input to an OFF terminal of the switching control circuit;
   an OFF mode control circuit that outputs the OFF mode cancellation signal according to a signal from the loading apparatus;
   an electric storage unit that supplies power to the OFF mode control circuit in the OFF mode;
   a power supply circuit that supplies the OFF mode control circuit with power corresponding to the output voltage; and
   an OFF mode delay circuit that delays the placing of the switching control circuit in the OFF mode for a first length of time when the input voltage is supplied for startup in the case where the OFF mode cancellation signal is not input to the OFF terminal,
   wherein the first length of time is greater than or equal to a length of time required for the OFF mode cancellation signal that is output from the OFF mode control circuit according to the startup with the input voltage to be input to the OFF terminal since timing of the startup with the input voltage.

2. The switching power supply apparatus according to claim 1, further comprising:
   a DC connector for connecting or disconnecting the loading apparatus,
   wherein the OFF mode control circuit, the electric storage unit, and the power supply circuit are disposed closer to the loading apparatus than to the DC connector, and
   in the case where the DC connector is disconnected, when the OFF mode cancellation signal is not input to the OFF terminal, and the input voltage is supplied for the startup, the switching control circuit is placed in the OFF mode after the first length of time has elapsed since the timing of the startup with the input voltage.

3. The switching power supply apparatus according to claim 1, further comprising an OFF mode forced cancellation circuit that cancels the OFF mode independently of whether the OFF mode cancellation signal is input to the OFF terminal.

4. The switching power supply apparatus according to claim 3, further comprising:
 an input interruption detection circuit that outputs an input interruption detection signal to the OFF mode delay circuit when application of the input voltage is interrupted,
 wherein the OFF mode forced cancellation circuit cancels the OFF mode according to output of the input interruption detection signal.

5. The switching power supply apparatus according to claim 1, wherein the electric storage unit is configured to supply power to the loading apparatus.

6. A semiconductor device for controlling a switching power supply apparatus, the semiconductor device being included in the switching power supply apparatus, the semiconductor device comprising the switching control circuit according to claim 1.

\* \* \* \* \*